United States Patent [19]

Tsai et al.

[11] Patent Number: 5,217,573
[45] Date of Patent: Jun. 8, 1993

[54] REMOVAL OF LASER PRINTER AND XEROGRAPHIC INK FROM RECYCLE PAPER

[75] Inventors: Ted Y. Tsai, Harriman; Long S. Wang, New City, both of N.Y.

[73] Assignee: International Paper Company, Purchase, N.Y.

[21] Appl. No.: 872,544

[22] Filed: Apr. 23, 1992

[51] Int. Cl.$^5$ .............................. D21C 5/02
[52] U.S. Cl. ............................ 162/5; 162/55
[58] Field of Search ...................... 162/5, 55

[56] References Cited

U.S. PATENT DOCUMENTS

| | | | |
|---|---|---|---|
| 3,392,083 | 7/1968 | Illingworth | 162/5 |
| 4,276,118 | 6/1981 | Quick | 162/5 |
| 4,483,742 | 11/1984 | Bridle | 162/5 |
| 4,562,933 | 12/1985 | Wood | 162/5 |
| 4,643,800 | 2/1987 | Maloney et al. | 162/5 |
| 4,820,379 | 4/1989 | Darlington | 162/5 |
| 4,964,949 | 10/1990 | Hamaguchi et al. | 162/5 |

FOREIGN PATENT DOCUMENTS 303190  12/1988  Japan .

OTHER PUBLICATIONS

Chemical Abstracts 233484r-based on Japan 63/303190 Dec. 1988.

*Primary Examiner*—Karen M. Hastings
*Attorney, Agent, or Firm*—Luedeka, Hodges, Neely & Graham

[57] ABSTRACT

A method for removing laser printer and xerographic toner, ink or the like from paper to be recycled comprising pulping the paper to be recycled with water to produce a paper pulp slurry with a consistency of between about 1% and 20%, adjusting the pH of the slurry to between about 6 and about 13, adding between about 0.3 and about 5.0 wt. %, based on the dry weight of the paper, of a surfactant to the slurry, the surfactant having the formula $R^1-R^2-R^3$, wherein $R^1$ and $R^3$ are each selected from the group consisting of rosins, rosin dimers and mixtures of rosins and rosin dimers and $R^2$ is a polyethylene glycol (PEG) having a molecular weight of between about 220 and about 660 Da, and adding between about 0.01 and about 5.0 wt. % of polyacrylic acid to the slurry, maintaining the slurry at a temperature of between about 30° C. and about 120° C. for a period of between about 5 minutes and about 90 minutes, and removing the ink from fibers of the paper as agglomerated particles, the particles having diameters of between about 1 mm and about 3 mm.

11 Claims, No Drawings

REMOVAL OF LASER PRINTER AND XEROGRAPHIC INK FROM RECYCLE PAPER

The present invention relates to methods for the removal of toner, ink or the like from paper. More specifically, the invention relates to methods for the removal of laser and impact printer and xerographic toner, ink or the like from recycle paper.

As used herein "ink" means any of the inks, toners or the like as referenced above.

The amount of paper printed with electrostatic toners continues to increase as low cost laser printers and xerographic copiers become more common in businesses and at home. As a result, these papers are becoming a more important secondary fiber source to recycling mills.

In general, the conventional ink removal processes of alkaline washing and flotation are inadequate to the task of removing the electrostatic toner ink from the fibers. The toner particles removed from the repulped fibers during the conventional process are usually flat flakes and small ink particles which will easily slip through the slots in commonly used removal screens. Thus, the recycled papers prepared using papers printed with laser printers or xerographic copiers usually have higher dirt counts and are less bright than similar grade recycled paper printed using other techniques. In most cases, as the dirt count of the recycled papers goes up, the value of the paper goes down.

Since offices can use a variety of printers, the papers received at the recycling mill often contain a variety of papers printed with a variety of inks. The inks from those papers printed with inks of the class described will contaminate the recycled fibers of the papers which were printed with other types of inks. When papers printed with electrostatic toners are mixed, for example, with papers printed by other methods, paper prepared from the recycled pulp will have dirt counts near those of papers prepared from recycled papers printed with inks of the class described. Therefore, papers printed with electrostatic toners are not only difficult to recycle but they may make other papers difficult to recycle as well.

Accordingly, it is an object of the present invention to provide a method for removing the ink from papers printed with inks of the class described.

Further, it is an object of the present invention to provide a method for reducing the dirt count of papers prepared from recycled papers printed with inks of the class described.

The present invention provides a method for removing laser printer and xerographic toner, ink or the like from paper. In the practice of the invention, the paper, which has been printed with electrostatic toners, inks or the like is first pulped with water to a slurry with a consistency of between about 1% and 20%. Preferably, the slurry has a consistency of between about 3% and 15%. The pH of the slurry is adjusted to between about 6 and 13. Up to this point, the method is quite similar to prior art methods of alkaline washing and flotation for the removal of ink from paper.

The next step is the addition of from about 0.3 wt. % to about 5.0 wt. %, based on the dry weight of the paper, of a surfactant having the formula $R^1$—$R^2$—$R^3$. $R^1$ and $R^3$ of the surfactant are each selected from the group consisting of rosins, rosin dimers, and mixtures of rosin and rosin dimers. $R^2$ of the surfactant is a polyethylene glycol (PEG) with a molecular weight of between about 220 Da and about 66 Da(Daltons). In a preferred embodiment, the surfactant is added to the slurry at between about 0.3 wt. % and about 1.0 wt. %. The molecular weight of the PEG of the $R^2$ is preferably about 400 Da, and $R^1$ and $R^3$ preferably have molecular weights of about 300 Da.

The surfactant of the present invention is generally prepared by the reaction of one molar unit of polyethylene glycol (PEG) with two or more molar units of rosins, rosin dimers or mixtures of rosins and rosin dimers in the presence of an acid catalyst (such as hypophosphorus acid, phosphoric acid or paratoluene sulfonic acid). The reaction is generally carried out at temperatures between about 220° C. and about 280° C. for a period of between about 20 hours and about 40 hours. The resulting product is typically a viscous liquid or low melting solid.

Rosins, as used in the present invention, refer to rosin acids of the abietic and pimaric types, having the general formula $C_{20}H_{28\ to\ 32}O_2$, and having a partially hydrogenated phenanthrene nucleus. Rosins are commonly derived from pine trees by the acidification and fractionation of the extracts isolated from the waste liquors of the alkaline pulping of pine. Rosin dimers are high molecular weight multi-basic acids produced by the reaction of unsaturated rosins at mid-molecule and usually have molecular weights which are multiples of the molecular weights of rosins and are polymers of the rosins; i.e., $(C_{20}H_{28\ to\ 32}O_2)_x$ where $x=2$, 3, or 4.

PEG is a condensation polymer of ethylene glycol and is commercially available in molecular weights of from about 200 Da to about 6000 Da. The present invention uses PEG with molecular weights of between about 220 Da and about 660 Da. Preferentially, the surfactant of the present invention is prepared from PEG-400, with a molecular weight of about 400 Da.

Polyacrylic acid is also added to the slurry at between about 0.01 wt. % and about 5.0 wt. %, based on the dry weight of the paper. Preferably, the polyacrylic acid is added to the slurry at between about 0.2 wt. % and 1.0 wt. %. The polyacrylic acid of the present invention has a molecular weight range of from about 1000 Da to about $5 \times 10^6$ Da. A preferred molecular weight is between about 5000 Da and $1 \times 10^6$ Da.

The paper pulp slurry is maintained at a temperature of between about 30° C. and about 120° C. for a period of between about 5 minutes and about 90 minutes. At that point, the toner, ink or the like are separated from the fibers of the paper and begins to agglomerate into particles having diameters of between about 1 mm and about 3 mm. In practice, it is often desired to maintain the slurry at a temperature of between about 50° C. and 95° C. for a period of between about 30 minutes to 60 minutes.

The toner, ink or the like is then removed from the slurry. Since the toner, ink or the like agglomerates into relatively large particles, the toner, ink or the like can be removed by screening or by centrifugation. The density and shape of the particles are believed to account for the ease of removal by centrifugation. Also, the particles are removable by the use of magnetic skimmers since the toner, ink or the like often contains large amounts of iron.

The method of the present invention provides pulp from paper printed with electrostatic toner with dirt counts that are significantly lower than the dirt counts of the starting pulp and significantly lower than the dirt counts of pulp prepared using prior art techniques. The pulp produced by the method of the present invention has had greater than 90% of the toner, ink or the like removed after only two stages (screening followed by centrifugation) of toner, ink or the like removal. In contrast, pulp treated without the surfactant and polyacrylic acid of the present invention has had only about 50% of the ink removed after the same two stages of toner ink or the like removal.

In order to provide a better understanding of the present invention, the following examples are given primarily for the purposes of illustrating certain more specific details thereof.

EXAMPLE I

Removal of Xerographic Ink from Copier Paper

Copier paper, 50 g, which had been xerographically printed on an EKTASPRINT 90E (Kodak) copy machine was added to 400 ml of water (at 50° C.), 0.5 g of NaOH, and 0.25 g of a surfactant according to the present invention in a 2 liter beaker. The surfactant was prepared by the condensation of a rosin with a molecular weight of 300 Da and a PEG-400 group with a molecular weight of 400 Da. The slurry was stirred for 5 minutes until the paper disintegrated into fibers. An additional 1600 ml of hot water (50° C.) was added to the slurry which was heated to 85° C. and stirred with a magnetic or mechanical stirrer for 60 minutes. The particles of ink agglomerated into large particles with diameters of between 1 mm and 3 mm. The ink particles were readily removed from the slurry with a laboratory screen with ten thousandth of an inch slots.

EXAMPLE II

Removal of Laser Printer Ink from Paper

Paper, 50 g, which had been printed on a LASERJET IID (Hewlett-Packard) laser printer was added to 400 ml of water (at 50° C.), 0.5 g of NaOH, 0.25 g of the surfactant, as prepared in Example I, and 0.25 g of polyacrylic acid, with a molecular weight of about 5000 Da, in a 2 liter beaker. The slurry was stirred for 5 minutes until the paper disintegrated into fibers. An additional 1600 ml of hot water (50° C.) was added to the slurry which was heated to 90° C. and stirred with a magnetic stirrer for 60 minutes. The particles of ink agglomerated into large particles with diameters of between 1 mm and 3 mm. The ink particles were readily removed from the slurry with a laboratory screen with ten thousandth slots.

EXAMPLE III

A. The Removal of Ink by Slurring and Cleaning Without a Surfactant

Wastepaper, 40.9 kg, which had been printed with electrostatic toner was added to 760 liters of water at 70° C., and 100 g of NaOH in a 950 liter pilot plant hydropulper with a resulting pH of 10. The slurry was pulped for 10 minutes until the paper disintegrated into fibers. The particles of ink did not agglomerate, but remained as flakes or small ink particles with sizes well below 1 mm. The slurry was passed through a pressurized screen with ten thousandth slots followed by a centrifugal separation using a wet cyclone centrifuge. The results of the removal are shown in Column A of Table 1.

B. The Removal of Ink with a Surfactant

Wastepaper, 40.9 kg., which had been printed with electrostatic toner was added to 760 liters of water at 70° C., 100 g of NaOH, and 250 g of the surfactant prepared as in Example I in a 950 liter pilot plant hydropulper with a resulting pH of 10.2. The slurry was pulped for 30 minutes until the paper disintegrated into fibers and ink agglomerate. The particles of ink agglomerated into particles of between 1 mm and 3 mm diameter. The slurry was filtered with a pressurized screen with ten thousandth slots followed by a centrifugal separation using a wet cyclone centrifuge. The results of the removal are shown in column B of Table 1.

C. The Removal of Ink with a Surfactant and Polyacrylic Acid

Wastepaper, 40.9 kg, which had been printed with electrostatic toner was added to 760 liters of water at 80° C., 100 g of NaOH, 205 g of the surfactant prepared as in Example I, and 205 g of polyacrylic acid with a molecular weight of 100,000 Da in a 950 liter pilot plant hydropulper with a resulting pH of 10. The slurry was pulped for 30 minutes until the paper disintegrated into fibers and ink agglomerate. The particles of ink agglomerated into particles of between 1 mm and 3 mm diameter. The slurry was passed through a pressurized screen with ten thousandths slot followed by a centrifugal separation using a wet cyclone centrifuge. The results of the removal are shown in column C of Table 1.

TABLE I

| Sampling Point | Dirt Count[a] (normalized) | | |
|---|---|---|---|
| | A[b] | B[c] | C[d] |
| Pulper, before adding ink removal agent | 100.0 | 100.0 | 100.0 |
| Pulper, after adding ink removal agent | — | 58.0 | 61.0 |
| Screen feed | 85.3 | 66.4 | 111.2 |
| Screen accept | 59.1 | 64.5 | 47.6 |
| Screen reject | 95.6 | 140.2 | 492.8 |
| Reject/Accept dirt count ratio | 1.6 | 2.2 | 10.4 |
| Centrifuge feed | 57.0 | 55.7 | 56.4 |
| Centrifuge accept | 50.2 | 16.6 | 9.4 |
| Centrifuge reject | 100.5 | 163.8 | 222.1 |
| Ink Removal Efficiency | 49.8 | 83.4 | 90.6 |
| Reject/Accept dirt count ratio | 2.0 | 9.8 | 22.8 |

[a] A Quantimet 920 Image Analyzer was used to determine the dirt count of the pulp slurries.
[b] The original dirt count of 607 mm$^2$/m$^2$ was normalized to 100.
[c] The original dirt count of 2123 mm$^2$/m$^2$ was normalized to 100.
[d] The original dirt count of 807 mm$^2$/m$^2$ was normalized to 100.

In Example III, papers with different amounts of electrostatic toner were used for each part. The papers of part A pulped to a slurry with a dirt count of 607 mm$^2$/m$^2$, the papers of part B pulped to a slurry with a dirt count of 2123 mm$^2$/m$^2$, and the papers of part C pulped to a slurry with a dirt count of 807 mm$^2$/m$^2$. In order to compare the results of the different parts of the Example, all of the initial dirt counts were normalized to a value of 100. The actual dirt counts of part A can be determined by multiplying the values of Table I by 6.07, those of part B can be determined by multiplying the values of Table I by 21,23, and those of part C can be determined by multiplying the values of Table I by 8.07. The differences between screen accept and centrifuge feed are a result of the sampling technique and demonstrate the experimental error.

The initial addition of an ink removal agent reduced the dirt count of the pulp slurries prepared according to B and C compared to the dirt count of the initial pulp. The first filtration/screening step resulted in the removal of about 31% of the ink from untreated pulp slurry, A, a removal of about 3% of the ink from the slurry treated with the surfactant only, B, and a removal of about 57% of the ink from the slurry treated with both the surfactant and the polyacrylic acid, C. After an initial centrifugal step, there is only a slight improvement (12% additional ink removal) in the ink removal of the untreated pulp. The pulp treated with the surfactant alone had an additional 70% ink removal (83.4% total ink removal) and the pulp treated with both the surfactant and the polyacrylic acid had an additional 83% ink removal (90.6% total ink removal). The addition of the surfactant and the polyacrylic acid, as well as the addition of the surfactant alone, provides substantially superior ink removing capability over the prior art.

Hand sheets were prepared from the pulps of parts B and C of this Example. The physical properties of the hand sheets are given in Table II.

TABLE II

| Physical Property | B | C |
| --- | --- | --- |
| Basis weight (g/m$^2$) | 60.8 | 61.3 |
| Caliper (mil) | 4.00 | 4.134 |
| Apparent density (g/cm$^3$) | 0.599 | 0.585 |
| TAPPI Opacity (%) | 82.34 | 83.78 |
| Brightness (% GE) | 78.60 | 79.40 |
| Breaking length (m) | 3816.1 | 3713.1 |
| Stretch (%) | 2.290 | 2.390 |
| Tensile energy absorption (in*lb/in$^2$) | 0.2150 | 0.2166 |
| Burst factor | 25.55 | 25.60 |
| Tear factor | 106.57 | 97.24 |

Thus, the present invention provides a method for removing the ink from papers printed with toners, inks or the like as well as providing a method for reducing the dirt count of papers prepared from recycled papers printed with electrostatic toners.

Various of the features of the invention which are believed to be new are set forth in the appended claims.

What is claimed is:

1. A method for removing laser printer and xerographic ink from paper to be recycled, the method comprising:

pulping the paper to be recycled with water to produce a paper pulp slurry with a consistency of between about 1 and 20%;

adjusting the pH of the paper pulp slurry to between about 6 and about 13;

adding between about 0.3 and about 5.0 wt. %, based on the dry weight of the paper, of a surfactant to the paper pulp slurry, the surfactant having the formula $R^1$—$R^2$—$R^3$, wherein $R^1$ and $R^3$, each are selected from the group consisting of rosins, rosin dimers and mixtures of rosins and rosin dimers and $R^2$ is polyethylene glycol (PEG) having a molecular weight of between about 220 and 660 Da;

maintaining the paper pulp slurry at a temperature of between about 30° C. and about 120° C. for a period of between about 5 min. and about 90 min., such that the ink agglomerates into particles; and removing the agglomerated ink particles from the paper pulp slurry, the agglomerated ink particles having diameters of between about 1 mm and about 3 mm.

2. The method of claim 1 wherein the paper pulp slurry has a consistency of between about 3 and about 15%.

3. The method of claim 1 wherein between about 0.3 and about 1.0 wt. %, based on the dry weight of the paper, of the surfactant is added to the paper pulp slurry.

4. The method of claim 1 further comprising, prior to removing the agglomerated ink particles from the paper pulp slurry, adding between about 0.01 and about 5.0 wt. %, based of the dry weight of the paper, of polyacrylic acid to the paper pulp slurry.

5. The method of claim 4 wherein between about 0.2 and about 1.0 wt. %, based on the dry weight of the paper, of the polyacrylic acid is added to the paper pulp slurry.

6. The method of claim 1 wherein the paper pulp slurry is maintained at between about 50° C. and about 95° C.

7. The method of claim 1 wherein the paper pulp slurry is maintained at the temperature for a period of between about 30 minutes and about 60 minutes.

8. The method of claim 1 wherein $R^1$ and $R^3$ of the surfactant, independently, have molecular weights of about 300 Da and $R^2$ of the surfactant has a molecular weight of about 400 Da.

9. The method of claim 1 wherein the step of removing the agglomerated ink particles from the paper pulp slurry comprises filtering the slurry such that the agglomerated ink particles are caught in the filter.

10. The method of claim 1 wherein the step of removing the agglomerated ink particles from the paper pulp slurry comprises centrifuging off the agglomerated ink particles.

11. The method of claim 1 wherein the step of removing the agglomerated ink particles from the paper pulp slurry comprises removing the agglomerated ink particles with a magnetic force.

* * * * *